United States Patent
Sun et al.

(10) Patent No.: US 10,302,856 B2
(45) Date of Patent: May 28, 2019

(54) LIGHT-EMITTING UNIT, BACKLIGHT MODULE AND DISPLAY DEVICE

(71) Applicants: BOE Technology Group Co., Ltd., Beijing (CN); Beijing BOE Display Technology Co., Ltd., Beijing (CN)

(72) Inventors: Wenjia Sun, Beijing (CN); Xiuyun Chen, Beijing (CN); Daekeun Yoon, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 786 days.

(21) Appl. No.: 14/068,355

(22) Filed: Oct. 31, 2013

(65) Prior Publication Data
US 2014/0126240 A1 May 8, 2014

(30) Foreign Application Priority Data
Nov. 2, 2012 (CN) .......................... 2012 1 0433716

(51) Int. Cl.
*F21V 7/04* (2006.01)
*F21V 8/00* (2006.01)

(52) U.S. Cl.
CPC ......... *G02B 6/0091* (2013.01); *G02B 6/0031* (2013.01); *G02B 6/0068* (2013.01); *G02B 6/0073* (2013.01)

(58) Field of Classification Search
CPC .. G02B 6/0091; G02B 6/0031; G02B 6/0068; G02B 6/0073
(Continued)

(56) References Cited

U.S. PATENT DOCUMENTS

2008/0002428 A1  1/2008  Byun et al.
2008/0158477 A1  7/2008  Hsiao
(Continued)

FOREIGN PATENT DOCUMENTS

CN   101440925 A   5/2009
CN   101493603 A   7/2009
(Continued)

OTHER PUBLICATIONS

Office Action and Search Report issued by Chinese Patent Office for priority application 201210433716.1 dated Apr. 28, 2014.
(Continued)

*Primary Examiner* — Anh T Mai
*Assistant Examiner* — Meghan K Ulanday
(74) *Attorney, Agent, or Firm* — Haug Partners LLP

(57) ABSTRACT

The invention discloses a light-emitting unit, comprising a backplane and a light source provided on the backplane. The light source includes a plurality of sub light sources. The light-emitting unit further comprises light reflecting structures provided between the sub light sources. The light reflecting structures are configured to reflect the light radiating thereon from the sub light sources into the light-emitting direction of the light-emitting unit. Accordingly, the invention discloses a backlight module including the light-emitting unit and a display device including the backlight module. The backlight module in the invention is not only capable of improving a Hotspot phenomenon, but also capable of preventing the light source in the light-emitting unit from directly contacting with a light guide plate.

18 Claims, 1 Drawing Sheet

(58) Field of Classification Search
USPC .......................................................... 362/609
See application file for complete search history.

(56) References Cited

U.S. PATENT DOCUMENTS

| | | | |
|---|---|---|---|
| 2009/0201440 A1 | 8/2009 | Hamada | |
| 2011/0157914 A1* | 6/2011 | Chang .................. | G02B 6/0096 362/609 |
| 2013/0010495 A1* | 1/2013 | Moon .................... | G02B 6/003 362/609 |

FOREIGN PATENT DOCUMENTS

| | | |
|---|---|---|
| CN | 201439909 U | 4/2010 |
| EP | 1 909 026 A1 | 4/2008 |
| JP | 2006-019104 A | 1/2006 |
| JP | 2006-047339 A | 2/2006 |

OTHER PUBLICATIONS

Search Report issued in corresponding European Application No. 13190318.9 dated Nov. 20, 2017.

* cited by examiner

FIG.1
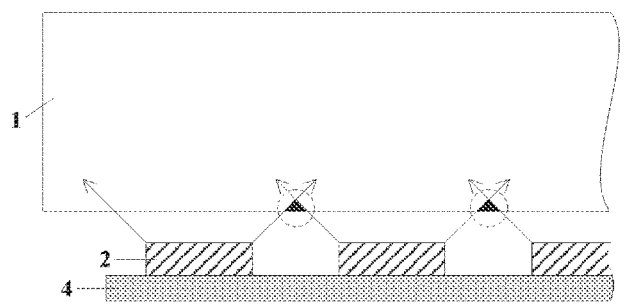
FIG.2
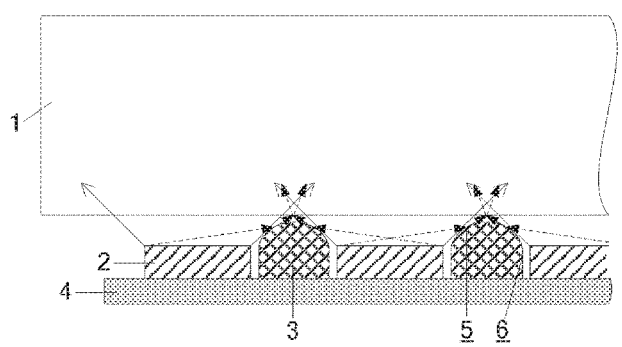
FIG.3
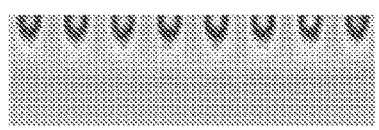 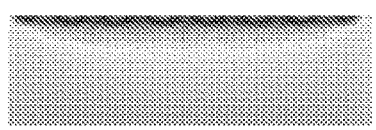
Fig.3(a)　　　　　　　　　　　　Fig.3(b)

LIGHT-EMITTING UNIT, BACKLIGHT MODULE AND DISPLAY DEVICE

FIELD OF THE INVENTION

The invention relates to a technology for manufacturing display, in particular, relates to a light-emitting unit, a backlight module including the light-emitting unit and a display device including the backlight module.

BACKGROUND OF THE INVENTION

Nowadays, the liquid crystal display (LCD) is occupying a leading position in the panel display market for its advantageous of small size, low power consumption, small radiation, and the like. In order to display a image on a display panel of LCD, it is necessary to configure a back light unit (BLU) for the display panel. This is because the liquid crystals in the LCD can not emit light by themselves, rather they just regulate the light.

In general, the BLUs may be categorized as side edge backlight modules and direct type backlight modules according to the position of light source therein. The light source in the side edge backlight module is positioned at sides of the display panel, and the light source in the direct type backlight module is positioned at the back of the display panel. The side edge backlight module is widely used in the industry for its advantageous such as low cost, small size and so on.

As shown in FIG. 1, the existing side edge backlight module generally includes a light guide plate (LGP) 1, a light source and an optical module (not shown in FIG. 1), wherein the light source includes a plurality of sub light sources 2 arranged in a line. Wherein, when Light Emitting Diode (LED) is used as the sub light source 2, on one hand, a Hotspot phenomenon occurs (that is, non-uniform luminance) and thus dark regions (black triangle regions in the dot-line circles on the light guide plate 1 as shown in FIG. 1) are generated on the light guide plate 1 due to constraints such as the emitting angle of LED or the like, therefore, in order to assure the uniformity in luminance of the backlight module, a large number of LEDs are used in the light source (for example, in a display device with 14 inch screen, at least forty LEDs horizontally provided on the long side(s) of the light guide plate are necessary), however, though the luminance requirement of the backlight module may be satisfied using a large number of LEDs, the power consumption and cost of the backlight module will be increased. On the other hand, in order to decrease the number of LEDs used, thus to decrease the power consumption and cost of the backlight module, high power LEDs may be used. However, heat may be generated during the operation of the LEDs so that a side of the light guide plate near the LEDs is apt to expand. Especially in a case of using high power LEDs, the expansion will aggravate, and the expanded light guide plate is apt to be in contact with the LEDs, causing a part of the expanded light guide plate at the contact position tend to melt.

SUMMARY OF THE INVENTION

For the above defects in the prior art, an object of the invention is to provide a light-emitting unit, a backlight module including the light-emitting unit and a display device including the backlight module, which are not only capable of improving the Hotspot phenomenon but also capable of preventing the light source from being in contact with the light guide plate.

Solution to Solve the Problems

The light-emitting unit comprises a backplane and a light source provided on the backplane, the light source includes a plurality of sub light sources, wherein the light-emitting unit further comprises at least one light reflecting structures provided between the sub light sources, the light reflecting structures are configured to reflect the light radiating thereon from the sub light sources into the light-emitting direction of the light-emitting unit.

Preferably, each of the light reflecting structures includes a base and a reflecting film layer overlapping on the base, the reflecting film layer overlapps on a surface of a side of the base which is far away from the backplane.

Preferably, the base is formed of a transparent material with refractivity in a range of 1.4~1.8.

Preferably, diffusion particles are dispersed in the reflecting film layer.

Preferably, the surface of the side of the base which is far away from the backplane has an arc profile or a polygon profile.

Preferably, each of the light reflecting structures is higher than the highest sub light source among the adjacent sub light sources thereof in the direction perpendicular to the backplane.

Preferably, each of the light reflecting structures is higher than the highest sub light source among the adjacent sub light sources thereof in the direction perpendicular to the backplane by 0.6 mm~1.0 mm.

Preferably, a side of each of the light reflecting structures being adjacent to its adjacent sub light source is equal to or longer than a corresponding adjacent side of the adjacent sub light source.

Preferably, the base is formed of heat-contractible material, and when the heat-contractible material is in a state of contraction, each of the light reflecting structures is higher than the highest sub light source among the adjacent sub light sources thereof in the direction perpendicular to the backplane.

Preferably, the sub light sources are formed of light emitting diodes or electroluminescent elements.

Meanwhile, the invention provides a backlight module comprising a light guide plate and the above light-emitting unit.

Preferably, the light reflecting structures are not brought into contact with the light guide plate.

Meanwhile, the invention provides a display device comprising the above backlight module.

BRIEF DESCRIPTION OF THE DRAWINGS

FIG. 1 is a diagram illustrating the configuration of a side edge backlight module in the prior art;

FIG. 2 is a diagram illustrating the configuration of a backlight module in the embodiment 2 according to the present invention; and FIG. 3 is an optical simulation diagram of the backlight module, wherein FIG. 3(a) is an optical simulation diagram of the backlight module shown in FIG. 1, and FIG. 3(b) is an optical simulation diagram of the backlight module shown in FIG. 2.

DETAILED DESCRIPTION OF THE EMBODIMENTS

For better understanding the solution of the invention by a person skilled in the art, a light-emitting unit, a backlight module including the light-emitting unit and a display device including the backlight module of the invention will be described in detail with reference to the drawings and embodiments.

Embodiment 1

The present embodiment provides a light-emitting unit, which comprises a backplane, a light source and a plurality of light reflecting structures. The light source includes a plurality of sub light sources which are arranged in a line, the light source is provided on the backplane, the plurality of light reflecting structures are provided between the plurality of sub light sources to reflect the light radiating thereon from the sub light sources into the light-emitting direction of the light-emitting unit.

Preferably, one of the plurality of the light reflecting structures is provided between two adjacent sub light sources, for example, the number of the sub light sources is n, and the number of the light reflecting structures is n−1, wherein n is a positive integer equal to or more than 2. The invention is not limited thereto, in contrary, it is not necessary to provide one light reflecting structure between every two sub light sources, but a person skilled in the art may select the number and the positions of the light reflecting structures based on practical application of the light-emitting unit, for example, one light reflecting structure may be provided every other two sub light sources.

Preferably, each light reflecting structure includes a base and a reflecting film layer overlapping on the base, the reflecting film layer overlaps on a surface of a side of the base which is far away from the backplane so that a part of light emitted from the adjacent sub light source radiating on the reflecting film layer is reflected into the light-emitting direction of the light-emitting unit.

Preferably, diffusion particles are dispersed in the reflecting film layer so that a part of light emitted from the sub light source adjacent thereto radiating on the reflecting film layer may diffuse more uniformly by the diffusion particles. Thus the diffusion particles have a function for diffusing and uniforming light, resulting in an increased light softness and an enhanced uniformity of light which is emitted from the light-emitting unit.

Preferably, the surface of the base which is far away from the backplane has an arc profile or a polygon profile, which is made for reflecting the part of light emitted from the adjacent sub light source radiating on the reflecting film layer into the light-emitting direction of the light-emitting unit. Alternatively, the surface may have other irregular profiles.

Preferably, the material forming the base has a refractivity in a range of 1.4~1.8, and the material is transparent. Since not all of the part of light emitted from the adjacent sub light source radiating on the reflecting film layer is reflected into the light-emitting direction of the light-emitting unit, rather, few part of the light may be refracted into the base, preferably the base is transparent in order that the few part of light refracted into the base may not be absorbed by the base. Also, in order to allow the light refracted into the base to refract again and refract out of the base in the light-emitting direction of the light-emitting unit, the refractivity of the material forming the base preferably is 1.4~1.8.

Preferably, the sub light sources are formed by light emitting diodes (LEDs) or electroluminescent elements (ELs).

In the embodiment of the invention, each light reflecting structure is provided between two or more sub light sources so that the light emitted from the sub light sources may be more uniform after being reflected by the light reflecting structure, and may enter into the dark regions on the light guide plate, so as to avoid the dark regions occurring on the light guide plate, and to considerable improve the Hotspot phenomenon.

Meanwhile, the invention provides a backlight module comprising the above light guide plate and light-emitting unit.

Preferably, the light reflecting structures in the light-emitting unit are not in contact with the light guide plate.

Embodiment 2

As shown in FIG. 2, the embodiment provides a backlight module, which comprises a light guide plate 1 and a light-emitting unit.

The light-emitting unit comprises a backplane 4, a plurality of sub light sources 2 provided on the backplane 4 and a plurality of light reflecting structures 3. Each of the plurality of light reflecting structures 3 is provided between two adjacent sub light sources 2 such that a part of light emitted from the two adjacent sub light sources 2 will radiate on the light reflecting structures and then be reflected into the light guide plate 1. The light emitted from the two adjacent sub light sources 2 can enter into the dark regions on the light guide plate 1 after being reflected by the light reflecting structures 3, so as to avoid or decrease to the greatest extent the occurrence of dark regions on the light guide plate 1, and to greatly improve the Hotspot phenomenon.

Preferably, the sub light sources 2 and the light reflecting structures 3 are not in contact with the light guide plate 1. This is because the contact of the sub light sources 2 with the light guide plate 1 may cause the light guide plate 1 melt due to heat from the sub light sources 2, and the contact of the light reflecting structures 3 with the light guide plate 1 may cause a part of light emitted from the adjacent sub light sources 2 to fail to enter into the dark regions on the light guide plate 1.

Each of the light reflecting structure 3 includes a base and a reflecting film layer 5 overlapping on a surface of a side of the base far away from the backplane, that is, on the surface of the side of the base near the light guide plate 1. Each of the light reflecting structure 3 includes transparent surfaces 6 so that light emitted from the adjacent sub light sources 2 may enter into the base. In the reflecting film layer, there are diffusion particles dispersed, so that the light entering into the light guide plate may be more uniform. The base is formed of transparent material, and the refractivity of the transparent material is 1.4~1.8, so that the light emitted from the adjacent sub light sources 2 may enter into the dark regions on the light guide plate 1 as much as possible by means of the reflection of the reflecting film layer overlapping on the base and the refraction of the base. The surface of the side of the base which is far away from the backplane 4 has an arc profile or a polygon profile to allow a part of the light emitted from the adjacent sub light sources 2 subjected to the reflection of the reflecting film layer overlapping on the base to enter into the dark regions on the light guide plate 1 as much as possible.

In the embodiments, the sub light sources 2 are formed of LEDs, and the plurality of LEDs are arranged in a line. In order to prevent the light guide plate 1 from melting due to heat resulted from the light guide plate 1 being in contact with the LEDs, the light reflecting structures 3 are higher in the direction perpendicular to the backplane 4 than the highest LED among the respective adjacent LEDs thereof. Preferably, the light reflecting structures 3 are higher in the direction perpendicular to the backplane 4 than the highest LED among the respective adjacent LEDs thereof by 0.6 mm~1.0 mm.

Preferably, the base is formed of transparent heat-contractible material. The heat-contractible material may contract when being heated. Therefore, when the light guide plate 1 expands towards the emitting surface of the LEDs due to heat, the heat-contractible material will contract in a direction away from the light guide plate 1, so that a certain interval between the light guide plate 1 and the light-emitting structures 3 may be maintained, which helps to enable a part of the light emitted from two adjacent LEDs radiating on the reflecting film layer to enter into the dark regions on the light guide plate 1. Also, even when the heat-contractible material is in a state of contraction, each of the light reflecting structures 3 is higher than the highest LED among the adjacent LEDs thereof in the direction perpendicular to the backplane 4, so as to prevent the light guide plate 1 from being in contact with the emitting surface of LED, and thus to prevent the light guide plate 1 from melting due to heat.

Preferably, the heat-contractible material is formed of polythene (PE), polyvinyl chloride (PVC), or polytetrafluoroethylene (PTEF) which exhibits mesh structure after subjected to a radiation from a radiating source or a chemical action. Specifically, common polymers with linear structure (such as PE, PVE, PTEF or the like) may have mesh structure through a radiation from a radiation source such as an electron accelerator, or through some chemical actions. The resultant polymers with mesh structure become the heat-contractible material with shape memory effect.

FIG. 3(a) is an optical simulation diagram of the backlight module in the prior art, and FIG. 3(b) is an optical simulation diagram of the backlight module in the embodiment according to the invention, wherein the number, positions and distribution of LEDs included in the backlight modules in FIG. 3(a) are the same as those in FIG. 3(b). It can be seen by the comparison between FIG. 3(a) and FIG. 3(b) that, without changing other structures and material of the backlight modules. Hotspot phenomenon is improved considerably by adding light reflecting structures each including a base formed of transparent heat-contractible material and a reflecting film layer provided on the base between two adjacent LEDs.

This embodiment also provides a method for preparing light reflecting structures based on existing backlight module, so as to form the backlight module in the embodiment, the method comprises steps:

1) Applying a transparent heat-contractible material on a substrate, wherein the substrate is formed of polyethylene terephthalate (PET) and the thickness thereof is less than 100 µm;

2) Shaping a surface of the transparent heat-contractible material applied on the substrate to form an arc profile or a polygon profile, in order to form a base, that is, the base includes the substrate and the transparent heat-contractible material applied on the substrate. Preferably, it is assumed that the length of a side of LED adjacent to the base (i.e., in the direction entering into the paper in FIG. 2) is A, and the maximum length of the base in the direction parallel to the side is B, preferably B is equal to or more than A, thus enabling the resultant light reflecting structures to fully reflect the light radiating thereon from the adjacent LEDs thereof into the dark regions on the light guide plate;

3) Applying a reflecting material doping with diffusion particles on the surface of the base, in order to form a reflecting film layer on the transparent heat-contractible material in the base (specifically on the surface of the side of base which is far away from the substrate):

4) Drying the base applied with the reflecting material in order to form a light reflecting structure; and 5) Applying optical clear adhesive (OCA) on the other side (that is, a side without the transparent heat-contractible material) of the substrate in the light reflecting structure, and then adhering a plurality of the light reflecting structures applied with OCA between two adjacent LEDs, in order to form a light-emitting unit, and further to form the backlight module in the embodiment.

In the above steps, the base includes the substrate used for applying the transparent heat-contractible material and the OCA, however, if the transparent heat-contractible material can perfectly adhere to the OCA, then the substrate is not necessary. That is, the base includes only the transparent heat-contractible material. The OCA is applied on a surface of a side of the base on which no reflecting material is applied to adhere the base between two adjacent LEDs thereof through the OCA, in order to form a light-emitting unit and further form a backlight module.

Other structures and functions thereof in this embodiment are identical with those in embodiment 1, thereby the repetitive description thereof is omitted.

Embodiment 3

This embodiment provides a display device comprising the backlight module in the embodiment 1 or the embodiment 2. As the light-emitting unit or the backlight module is adopted in the display device, therefore, the Hotspot phenomenon is improved and the displaying quality is enhanced. Meanwhile, as the guide light plate melting due, to heat as its contact with the LED is avoided, the stability of the display device can be increased.

It should be understood that the description of the embodiments above is only for the purpose of helping to understand the principle of the present invention. For the persons skilled in the art, various improvements and modifications may be applied to the present invention without departing from the spirit and theory of the present invention. These improvements and modifications are also covered by the scope of the claims of the present invention.

What is claimed is:

1. A light-emitting unit for a side-type backlight module, comprising:
    a backplane;
    a light source comprising a plurality of sub light sources on the backplane;
    a plurality of light reflecting structures with at least one of the plurality of light reflecting structures located between adjacent sub light sources of the plurality of sub light sources;
    wherein at least one of the plurality of light reflecting structures comprises a base and a reflecting film layer covering the base,
    wherein the base comprises a first surface distal to the backplane and a second surface adjacent to the first surface, wherein the first surface comprises a first portion facing the light source adjacent to the light reflecting structure and oblique to the backplane, wherein the reflecting film layer overlaps on the first portion, wherein the second surface is transparent, and wherein a part of light emitted from at least one of the adjacent sub light sources is refracted into the base through the second surface to be refracted again out of the base.

2. The light-emitting unit according to claim 1, wherein diffusion particles are dispersed in the reflecting film layer.

3. The light-emitting unit according to claim 2, wherein each of the light reflecting structures is higher than the highest sub light source among the adjacent sub light sources thereof in the direction perpendicular to the backplane.

4. The light-emitting unit according to claim 1, wherein the surface of a side of the base which is distal to the backplane has an arc profile or a polygon profile.

5. The light-emitting unit according to claim 4, wherein each of the light reflecting structures is higher than the highest sub light source among the adjacent sub light sources thereof in the direction perpendicular to the backplane.

6. The light-emitting unit according to claim 1, wherein each of the light reflecting structures is higher than the highest sub light source among the adjacent sub light sources thereof in the direction perpendicular to the backplane.

7. The light-emitting unit according to claim 6, wherein each of the light reflecting structures is higher than the highest sub light source among the adjacent sub light sources thereof in the direction perpendicular to the backplane by 0.6 mm-1.0 mm.

8. The light-emitting unit according to claim 6, wherein a side of each of the light reflecting structures being adjacent to its adjacent sub light source is equal to or longer than a corresponding adjacent side of the adjacent sub light source.

9. The light-emitting unit according to claim 1, wherein the sub light sources are formed of light emitting diodes or electroluminescent elements.

10. A backlight module comprising a light guide plate and the lightemitting unit according to claim 1.

11. The backlight module according to claim 10, wherein the light reflecting structures are not in contact with the light guide plate.

12. A display device comprising the backlight module according to claim 11.

13. A display device comprising the backlight module according to claim 10.

14. The light-emitting unit according to claim 1, wherein the base is formed of a transparent material.

15. The light-emitting unit according to claim 14, wherein the base is formed of a transparent heat contractible material, and when the heat contractible material is in a state of contraction, each of the light reflecting structures is higher than the highest sub light source among the adjacent sub light sources thereof in the direction perpendicular to the backplane.

16. The light-emitting unit according to claim 15, wherein the base is formed of heat-contractible material with shape memory effect.

17. The light-emitting unit according to claim 14, wherein the transparent material has a refractivity in a range of 1.4~1.8.

18. The light-emitting unit according to claim 1, wherein the second surface of the light reflecting structure is configured to refract light from the sub light sources.

* * * * *